(12) United States Patent
Clark

(10) Patent No.: US 6,700,840 B2
(45) Date of Patent: Mar. 2, 2004

(54) OPTICAL STORAGE METHOD AND APPARATUS HAVING ENHANCED RESOLUTION

(75) Inventor: Bryan Kevin Clark, Mountain View, CA (US)

(73) Assignee: Beyond 3, Inc., Fremont, CA (US)

( * ) Notice: Subject to any disclaimer, the term of this patent is extended or adjusted under 35 U.S.C. 154(b) by 498 days.

(21) Appl. No.: 09/871,512

(22) Filed: May 30, 2001

(65) Prior Publication Data

US 2002/0181342 A1 Dec. 5, 2002

(51) Int. Cl.[7] .................................................. G11B 7/00
(52) U.S. Cl. ................. 369/44.23; 369/44.14; 369/47.1; 369/112.01; 369/275.1
(58) Field of Search ............................ 369/44.23, 44.14, 369/44.26, 44.27, 44.28, 44.34, 47.1, 47.46, 47.5, 53.1, 59.1, 112.01, 112.27, 275.1, 275.3, 275.4

(56) References Cited

U.S. PATENT DOCUMENTS 5,995,473 A * 11/1999 Choi ..................... 369/112.19
6,192,020 B1 * 2/2001 Takasuka et al. ......... 369/44.23

* cited by examiner

*Primary Examiner*—Muhammad Edun
(74) *Attorney, Agent, or Firm*—Andrew M. Harris; Jeffrey D. Moy; Weiss, Moy & Harris, P.C.

(57) ABSTRACT

An optical storage method and apparatus having enhanced resolution uses a Fabry-Perot cavity to narrow a beam used for reading data stored on media. The method and apparatus achieve an enhanced resolution due to the reduction of beam size and the increased slope of the beam profile in a beam used to illuminate physical changes in the media corresponding to data encoded in the media. The Fabry-Perot cavity may be included in a media for use with standard optical storage devices or may be external to the media, as part of an optical storage head for use with standard media.

28 Claims, 3 Drawing Sheets

OPTICAL STORAGE METHOD AND APPARATUS HAVING ENHANCED RESOLUTION

RELATED APPLICATIONS

This application is related to pending U.S. patent application Ser. No. 09/789,913 entitled "SYSTEM OF BEAM NARROWING FOR RESOLUTION ENHANCEMENT AND METHOD THEREFOR" filed on Feb. 21, 2001, the specification of which is incorporated herein by reference.

BACKGROUND OF THE INVENTION

1. Field of the Invention

This invention relates to optical storage systems and media, and more specifically, to an optical storage system incorporating a Fabry-Perot cavity to control illumination characteristics at a media surface.

2. Description of the Related Art

Optical media stores information via physical artifacts or discontinuities on a surface of interest. Digital data may be encoded by a series of pits in a reflective mask attached to a supportive plastic structure such as present-day compact disc (CD) media.

Data is read from the media by measuring the distribution of the field reflected by data-bearing features on the surface of interest. Present-day high resolution optical readers measure diffraction caused by data-bearing surface features by combining light reflected from an artifact on a rotating disc with light that was reflected from an adjacent artifact. A data signal is extracted by determining the distortion of the diffraction field and is detected by sampling one or more points within the field using detectors, thereby detecting the phase within the reflected beam as well as its amplitude.

Measuring phase and amplitude provides an improvement over amplitude-only systems, and using a diffracted field detection system permits detection of data-bearing features having very small height variations. However, the limitation on data density is the spatial resolution limitation set by the size of the focused beam on the surface of interest.

Therefore, it would be desirable to provide a method and apparatus having an enhanced spatial resolution for reading data from standard media by illuminating the media with a narrowed beam. It would further be desirable to provide an improved media having enhanced spatial resolution via a narrowed beam.

SUMMARY OF THE INVENTION

The foregoing objectives are achieved in an optical storage method and apparatus having enhanced resolution. A media storage for encoding data includes a first reflective surface having physical artifacts corresponding to encoded data and a second partially reflective surface positioned parallel to the first reflective surface and at a tuned optical distance from the first reflective surface, such that at a predetermined illumination wavelength, a beam transmitted through the second partially reflective surface and illuminating the first reflective surface has a minimum radius spot size at the first reflective surface.

As an alternative preferred embodiment, an optical storage system includes an optical illumination/collection subsystem for producing a beam to illuminate a media storage surface and collect the field reflected by it and a partially reflective surface positioned parallel to the media storage surface between the optical illumination system and the media storage surface at a tuned optical distance from the media storage surface. The positioning of the partially reflective surface produces a beam having a minimum radius spot size at the media storage surface.

The foregoing and other objects, features, and advantages of the invention will be apparent from the following, more particular, description of the preferred embodiment of the invention, as illustrated in the accompanying drawings.

DESCRIPTION OF THE PREFERRED EMBODIMENTS

Figure 1:
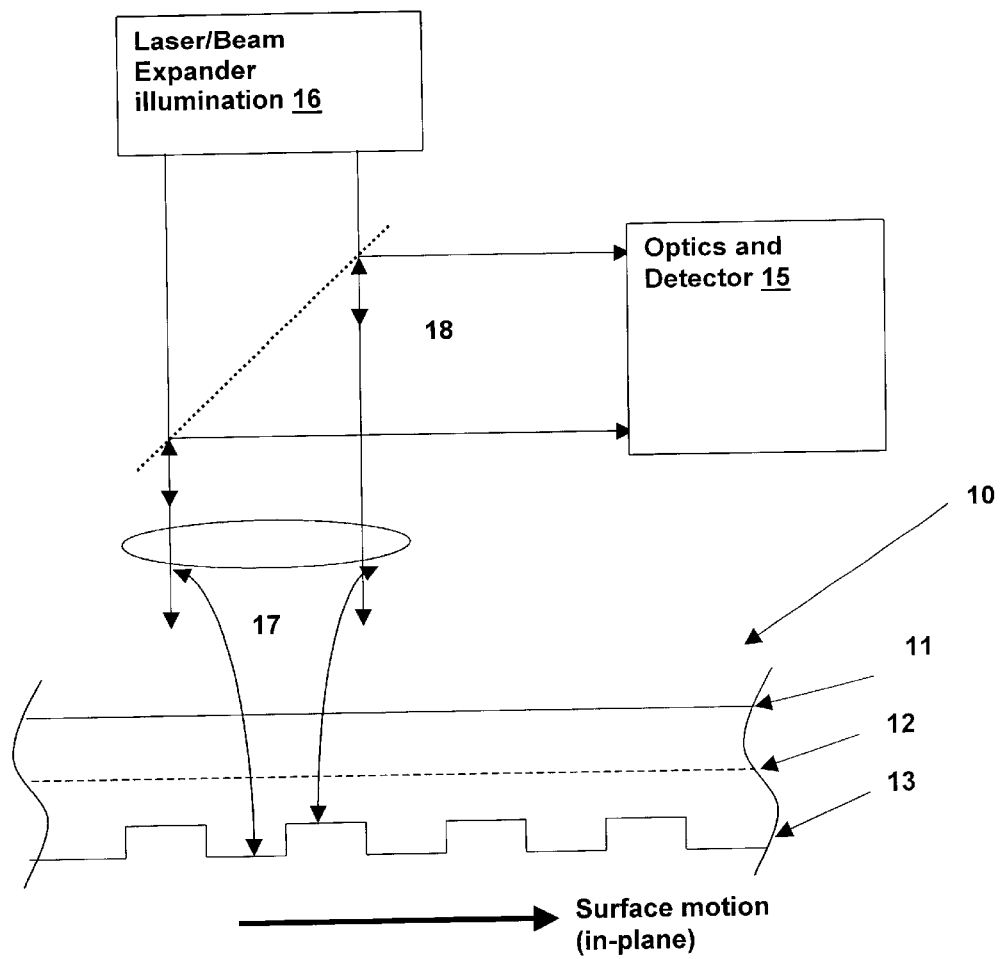
FIG. 1 is an illustration depicting an optical storage system in accordance with a first preferred embodiment of the invention.

With reference now to the figures, and particularly to FIG. 1, an optical storage system in accordance with a first preferred embodiment of the invention is depicted. In the first preferred embodiment, a novel media is used to increase resolution within an optical storage system. While the description is made generally with reference to optical retrieval, the techniques of the present invention may apply equally to recording systems that alter recordable media by illuminating the media with a narrowed beam. The present invention may also apply to a system in which light is transmitted through media rather than reflected from a fully reflective surface of interest.

An illumination subsystem 16 is provided to illuminate a surface of interest 13 within optical media 10. A direct beam 17 is reflected by the surface of interest 13 which is moving in the plane of the figure as noted, so that the physical deviations of surface of interest 13 (from that of an perfectly planar surface) modulate the intensity and phase distribution of the reflected beam 18 which enters a detector 15. While optical media 10 is depicted as a form of media having physical discontinuities in the height of surface of interest 13, the present invention applies also to media with a constant-plane surface of interest having variable reflectivity, and surfaces having other height variation profiles. For example, the present invention applies to recordable media using inks that are rendered transparent in the recording process, producing a storage medium having an effective surface of interest with varying reflectivity.

Within optical media 10, a partially reflective surface 12 is created by depositing an optical coating, a thin-film layer, a layer with differing index of refraction, or other means that will be apparent to those skilled in the art of media fabrication. The partially reflective surface 12 may be a bragg grating formed by layers of differing refractive index and spaced at one-half wavelength distance, or may be a refractive change in the material introduced by doping the material with another material to produce a layer having a differing refractive index from other layers within optical media 10.

The distance between partially reflective surface 12 and surface of interest 13 is carefully controlled so as to create a beam-narrowing effect via a tuned distance between surface of interest 13 and partially reflective layer for at least one of the distances corresponding to the deviations of surface of interest 13. The positioning of partially reflective surface 12 with respect to surface of interest 13 is such that a condition relative to the resonance condition is maintained. In actuality, the position is a location close to anti-resonance that produces a beam of minimum radius spot size at the surface of interest, through interference of the direct and reflected beams within the Fabry-Perot cavity. At the illumination wavelength emitted from illumination system 16, a predetermined number of wavelength fractions exist between partially reflective surface 12 and one of the data positions of surface of interest 13. Surface variation of the data pattern should be held to less than a quarter of the illumination wavelength, as at variations greater than one quarter of the illumination wavelength the next resonance may interfere with the optical detection signal.

Figure 3:
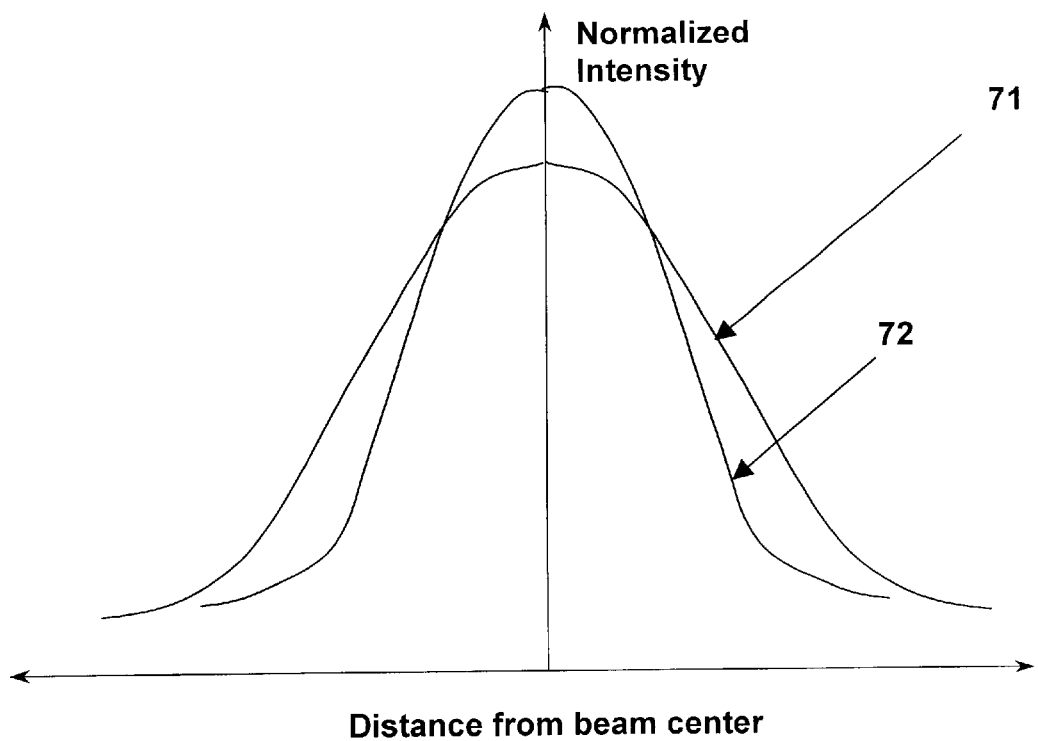
FIG. 3 is a graph depicting the narrowed beam illuminating the surface of interest in the optical storage systems of FIG. 1 and FIG. 2.

The positioning of surface of interest 13 and partially reflective surface 12 produces a beam-narrowing effect due to the resonant cavity created between partially reflective surface 12 and surface of interest 13. This positioning at a tuned optical distance reduces the effective spot size of the beam, increasing the number of data bits that may be encoded without interference from light reflecting from adjacent data bits. Referring now to FIG. 3 the intensity profile 71 of direct beam 17 emitted from illumination subsystem 16 and an intensity profile 72 of the illumination at surface of interest 13 is depicted in graphical form. As shown by the figure, a reduction in spot size over the gaussian illumination of direct beam 17 of 40% may be achieved using the resonant cavity of the present invention. This cavity is known in the art as a Fabry-Perot cavity. In this application, the Fabry-Perot cavity produces a beam-narrowing effect as described in the above-incorporated patent application "SYSTEM OF BEAM NARROWING FOR RESOLUTION ENHANCEMENT AND METHOD THEREFOR".

Figure 2:
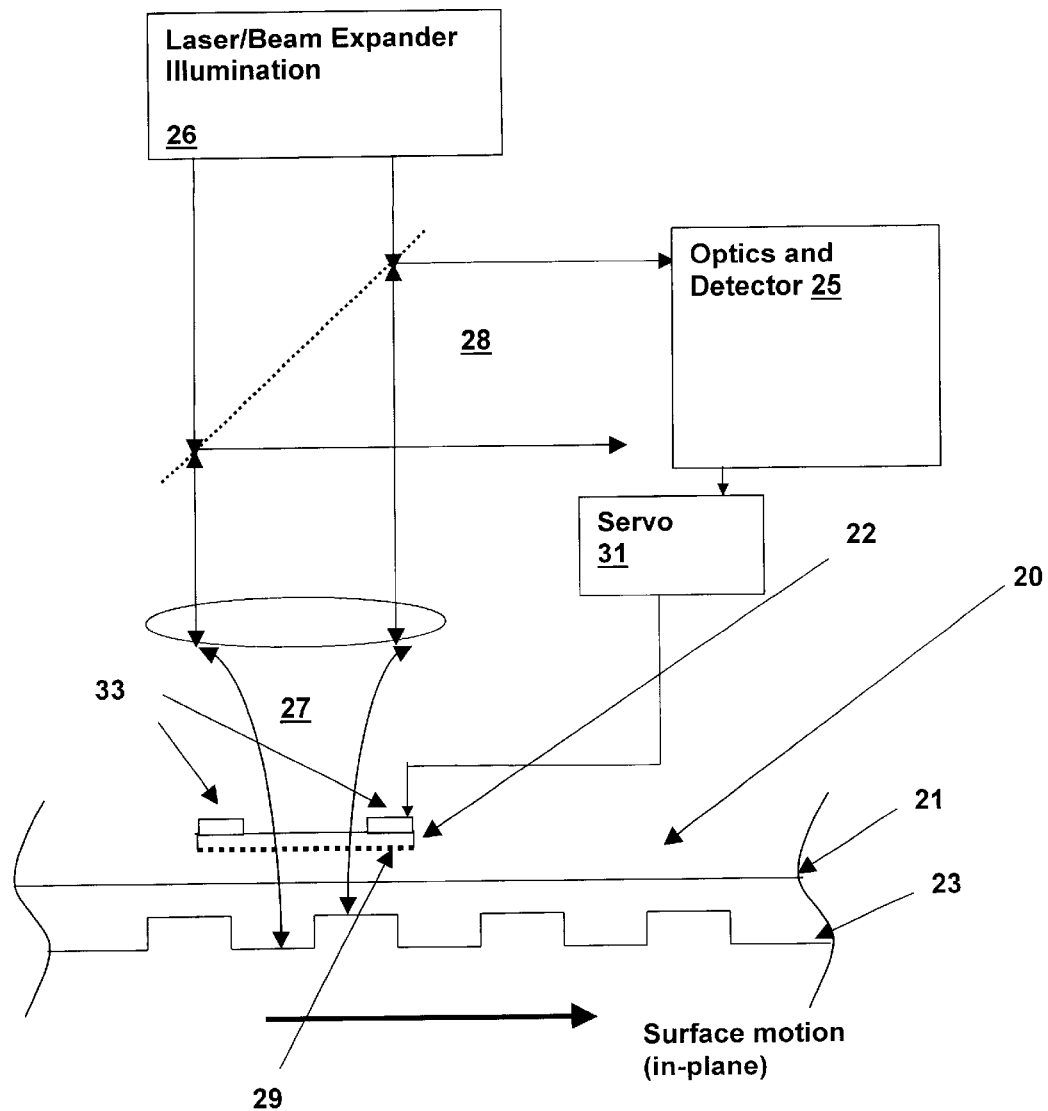
FIG. 2 is an illustration depicting components of an optical storage system in accordance with a second preferred embodiment of the invention.

Referring now to FIG. 2, an optical storage system in accordance with a second preferred embodiment of the invention is depicted. In the second embodiment, a system is implemented that uses media that may be standard media or a new media devised to take advantage of the improved resolution of the present invention. In the second embodiment, a reference plate 22 having a partially reflective surface 29 is inserted between an illumination subsystem comprising a laser and a beam expander 26 producing a direct beam 27 for illuminating a surface of interest 23 within a standard optical storage media 20.

Reference plate 22 is located such that partially reflective surface 29 is positioned at a distance from surface of interest 23 corresponding to a predetermined number of wavelengths of the light emitted by illumination subsystem 26. The distance between partially reflective surface 29 and surface of interest 23 is the predetermined number of wavelengths for at least one of the distances corresponding to the deviations of surface of interest 23. As described above for the first embodiment of the invention, this positioning of partially reflective surface 29 and surface of interest 23 creates a Fabry-Perot cavity between partially reflective surface 29 and surface of interest 23. A detector including associated optics 25 is used to detect a reflected beam 28, permitting detection of data variations in surface of interest 23 and providing control functions for positioning reference plate 22.

Referring again to FIG. 3, the intensity profile improvement as applied to the second embodiment of the invention is described. The intensity profile 71 of direct beam 27 emitted from illumination subsystem 26 and an intensity profile 72 of the illumination at surface of interest 23 is depicted in graphical form. As shown by the figure, a reduction of 40% in the illumination spot size relative to the spot size produced by gaussian illumination 27 may be achieved using the resonant cavity of the present invention.

In contrast to the first embodiment of the invention wherein the tuned optical distance between surface of interest 13 and partially reflective surface 12 is fixed in the manufacture of storage media 10, in the second embodiment of the invention, the tuned optical distance between partially reflective surface 29 and surface of interest 23 is generally greater and requires dynamic control. The control mechanism is based on the average reflectivity of the Fabry-Perot cavity and is a feedback control apparatus as may be readily implemented by one skilled in the art of positional control.

The control mechanism for controlling the position of reference plate 22 and thereby partially reflective surface 29 includes a detector and associated optics 25 coupled to a servo system 31. Detector 25 may comprise a single detector for receiving data as well as controlling position or separate detectors may be used for data and positional control. Servo 31 has an output coupled to piezoelectric transducer 33 for positioning reference plate 22 with respect to surface of interest 23. Detector 25 controls servo 31 to move piezoelectric transducer 33 until a nominal predetermined optical power level is detected by detector 25. The servo system loop will then maintain the position of reference plate 22 at the tuned optical distance to produce a reduced illumination spot size at surface of interest 23.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An optical storage system comprising:
   an optical illumination system for producing a beam for illuminating a media storage surface;
   a partially reflective surface positioned parallel to said media storage surface between said optical illumination system and said media storage surface and at a tuned optical distance from said media storage surface, whereby said beam has a minimum radius spot size at said media storage surface; and
   a detector for measuring light leaving said media storage surface.

2. The optical storage system of claim 1, wherein said light leaving said media storage surface is reflected from said media storage surface.

3. The optical storage system of claim 1, wherein said light leaving said media storage surface is transmitted through said media storage surface.

4. The optical storage system of claim 1, wherein said at least one partially reflective surface is contained within said media.

5. The optical storage system of claim 4, wherein said at least one partially reflective surface is a bragg grating.

6. The optical storage system of claim 4, wherein said at least one partially reflective surface is formed by at least one layer within said media having refractive index differing from other layers within said media.

7. The optical storage system of claim 1, wherein said at least one partially reflective surface is a surface of a reference plate in an optical path of said optical illumination system.

8. The optical storage system of claim 7, wherein said reference plate is a lens within said optical illumination system and said partially reflective surface is a surface of said lens.

9. The optical storage system of claim 7, further comprising a control system coupled to said detector for producing a signal for controlling a position of said partially reflective surface.

10. The optical storage system of claim 9, wherein said control system comprises:

a servo system electrically coupled to said detector for controlling a position of said partially reflective surface; and a positioner mechanically coupled to said reference plate and electrically coupled to said servo system for controlling said position of said partially reflective surface whereby said position is maintained at said tuned optical distance.

11. The optical storage system of claim 10, wherein said control system detects an average power received at said detector, compares said average power with a predetermined power value associated with a nominal optical distance from said surface of interest and maintains said tuned optical distance in conformity with said average power.

12. A media storage for encoding data, comprising:

a first reflective surface having physical artifacts corresponding to said encoded data; and a second partially reflective surface positioned parallel to said first reflective surface and at a tuned optical distance from said first reflective surface, such that at a predetermined illumination wavelength a beam transmitted through said second partially reflective surface and illuminating said first reflective surface has a minimum radius spot size at said first reflective surface.

13. The media storage of claim 12, wherein said second partially reflective surface is an optical coating deposited over said first reflective surface.

14. The media storage of claim 12 wherein said second partially reflective surface is a boundary of a laminated layer within said media storage.

15. The media storage of claim 12, wherein said second partially reflective surface is a bragg grating.

16. The media storage of claim 12, wherein said second partially reflective surface comprises at least one layer having a differing refractive index from other layers within said media.

17. A method of data retrieval comprising:

illuminating a partially reflective surface with an illumination beam from an illumination subsystem;

illuminating a media storage surface with a transmitted beam that is transmitted from said illumination beam through said partially reflective surface, wherein said partially reflective surface and said media storage surface are positioned parallel to each other and at a tuned optical distance such that said transmitted beam has a minimum radius spot size at said media storage surface; and detecting a reflected beam from said spot at said media storage surface, whereby data is retrieved from artifacts encoding said data at said media storage surface.

18. The method of claim 17, wherein said illuminating of said media storage surface is performed by transmitting said transmitted beam from a partially reflective surface within a media storage that includes said media storage surface.

19. The method of claim 17, wherein said second illuminating is performed by transmitting said transmitted beam through a partially reflective surface within said illumination subsystem.

20. The method of claim 17, wherein said second illuminating is performed by transmitting said transmitted beam from a partially reflective surface of a lens within said illumination subsystem.

21. The method of claim 19, wherein said detecting further comprises detecting an average power for determining that said media storage surface and said partially reflective surface are positioned at said tuned optical distance.

22. The method of claim 21, further comprising controlling a position of said partially reflective surface in response to said detection of said average power.

23. The method of claim 22, wherein said detection of said average power detects a predetermined nominal power, and wherein said controlling controls said position such that said predetermined nominal power is continuously detected.

24. A method of manufacturing an optical storage media comprising:

generating a data layer on a substrate; and adding a partially reflective surface to said substrate at a tuned optical distance from said data layer.

25. The method of claim 24, wherein said adding is performed by depositing an optical coating on said substrate.

26. The method of claim 24, wherein said adding is performed by laminating an optical layer on said substrate.

27. The method of claim 24, wherein said adding adds a bragg grating to said substrate.

28. The method of claim 24, wherein said adding alters a refractive index of a layer within said substrate.

* * * * *